Nov. 6, 1956 W. H. WEDGER 2,769,188
METHODS OF MAKING SHOES
Filed Jan. 12, 1955 2 Sheets-Sheet 1
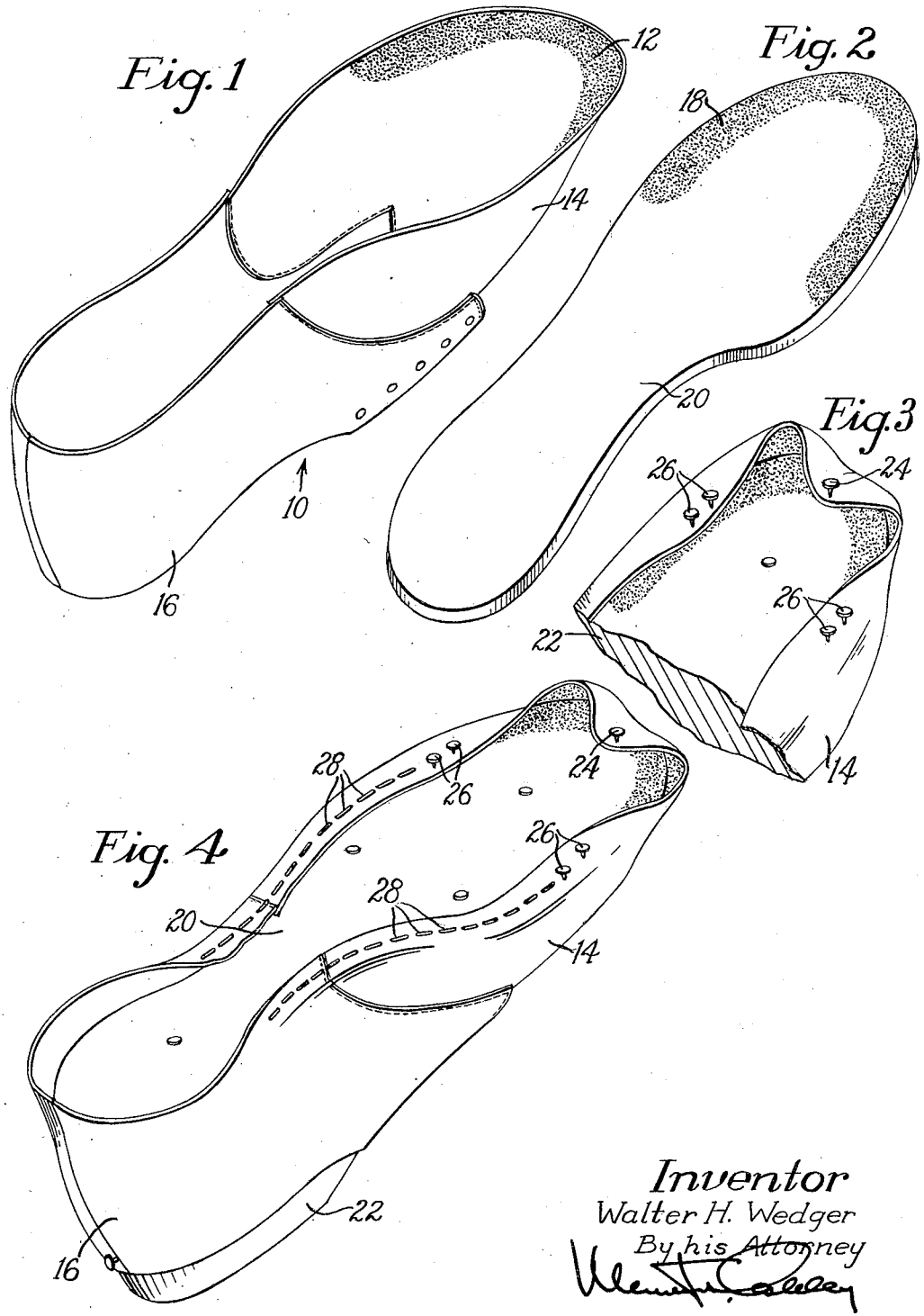
Inventor
Walter H. Wedger
By his Attorney

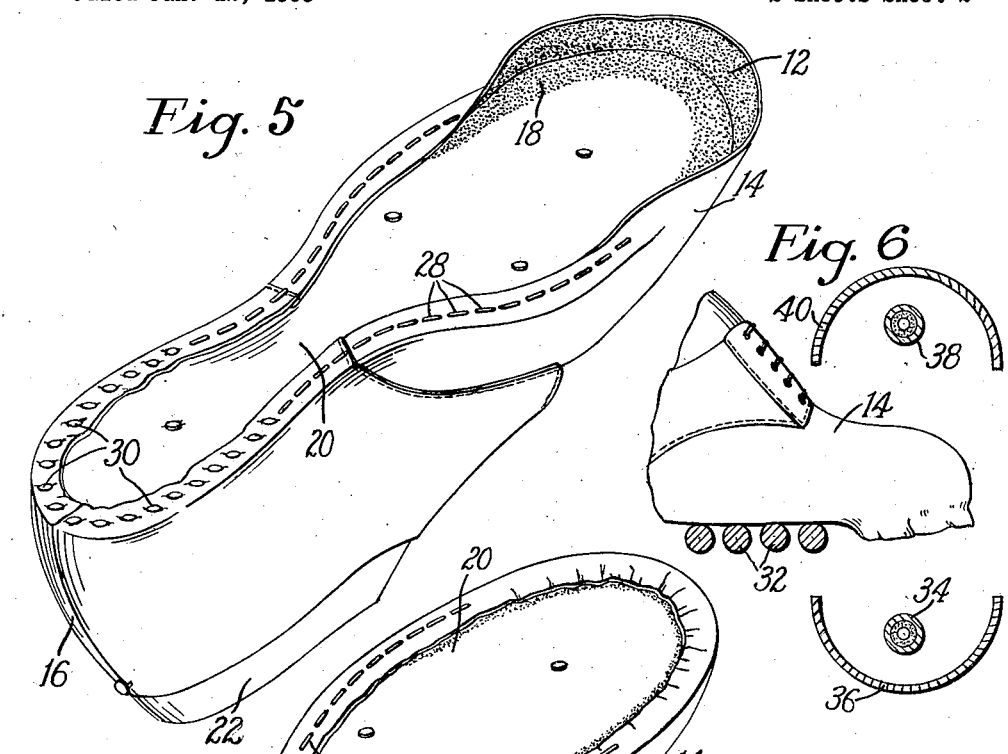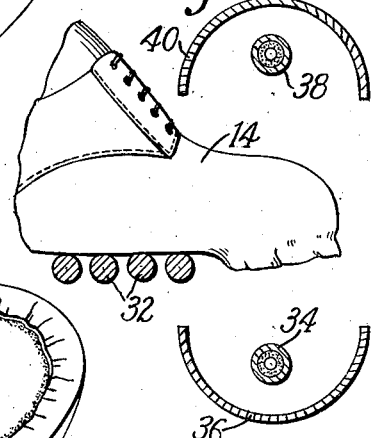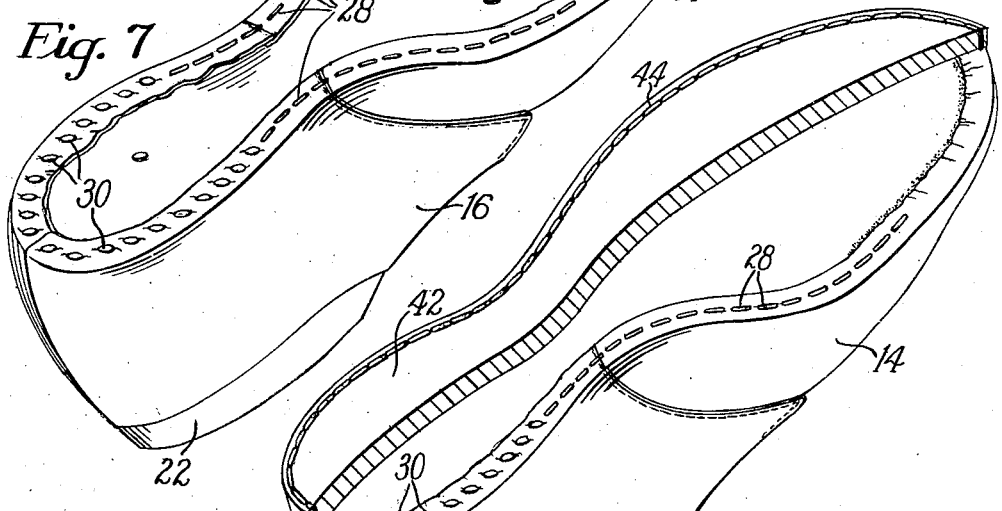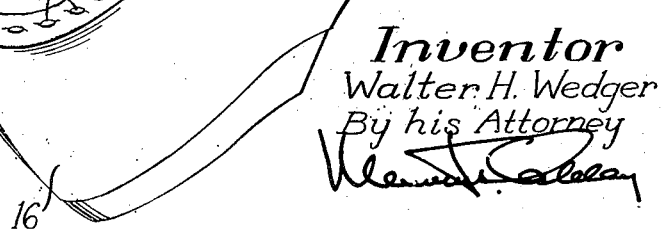

United States Patent Office 2,769,188
Patented Nov. 6, 1956

2,769,188

METHODS OF MAKING SHOES

Walter H. Wedger, Wellesley, Mass., assignor to B. B. Chemical Co., Boston, Mass., a corporation of Massachusetts Application January 12, 1955, Serial No. 481,379

4 Claims. (Cl. 12—142)

This invention relates to methods of making shoes and particularly to methods of cement-lasting the toe portions thereof.

Objects of the invention are to provide a method in the practice of which cement can be applied to the parts to be secured together at an early stage in the manufacture of the shoe, in the practice of which the cemented parts will not be caused to adhere during operations prior to lasting, and in the practice of which the cement on the upper and insole can conveniently be activated at the lasting operation and, when the upper is worked into lasted position, will act at once to hold the upper in finally lasted position, no other fastenings such as tacks, toe binding wires or toe plates being needed.

By the present method the hereinafter described cement is applied to the shoe parts which are to be held in lasted position thereby early in the manufacture of the shoe, for example in the fitting room, and when the parts are flat and the surfaces to which cement is to be applied are readily accessible, the cement becoming dry and nontacky so as not to stick the parts together at the pulling-over operation or other operations preceding the lasting operation. At the lasting operation the cement is activated by heat so that the upper, when worked into finally lasted position, will be instantly and permanently held in that position.

As applied to toe lasting, after the cement on the upper and insole is dry the upper is mulled, assembled with its insole on a last and pulled over, the pressure applied by the wipers of the pulling-over machine to the parts having dry cement thereon causing little or no adhesion of the parts to each other. The sides of the shoe are lasted in any convenient manner, for example by curved staples, the heel-seat is lasted with tacks and the pulling-over tacks are removed. The cement on the toe portion of the upper is subjected to the action of dry heat and the upper is conformed to the toe portion of the last, wiped in over the margin of the insole and pressed thereon where it is held without appreciable dwell of the wipers and without other holding means than the cement.

To enable the last to be removed at an early stage in the manufacture of shoes, the shoes are subjected to a drying operation, for example, in a chamber in which they are subjected to a draft of warm air while exposed to infrared radiation. The outsoles are then laid, the lasts removed, the soles attached by a through-and-through seam, and the shoes finished in the usual manner.

Other aspects of the invention will appear from the following description when read in connection with the accompanying drawings and will be pointed out in the appended claims.

In the drawings,

Fig. 1 is a perspective view of an upper showing the inner marginal portions of the lasting allowance to which cement has been applied;

Fig. 2 is a perspective view of an insole to the forepart of which cement has been applied;

Fig. 3 is a perspective view of the toe portion of a shoe after the upper and insole have been assembled on a last and the upper has been pulled over;

Fig. 4 is a perspective view of the shoe after it has been pulled over and the sides have been lasted with curved staples;

Fig. 5 is a perspective view of the shoe after the heel-seat has been lasted and the pulling-over tacks have been removed;

Fig. 6 is a side elevation, partly in section, of the shoe during heat treatment of the toe portion of the shoe to soften the upper and activate the cement on the sole and upper;

Fig. 7 is a perspective view of the shoe after the toe has been lasted; and

Fig. 8 is a perspective view, partly in section, of the shoe after attachment of the outsole by through-and-through fastenings.

In practising the procedure of the present invention, an upper 10 is prepared, as shown in Fig. 1, in the fitting room, cement 12 having been applied to the inner face of the lasting allowance of the forepart. This cement 12 may be applied to a vamp 14 while it is flat and before it is attached to a quarter 16. In the case of a lined upper, cement will, of course, be applied to the inner and outer faces of the lasting allowance of the lining. When a toe box is used it may be either a short box or, if long, may have cement applied to the inner and outer marginal portions thereof.

Cement 18 is applied, preferably in the fitting room, to the outer marginal portion of the insole 20, as shown in Fig. 2. There is no objection to applying the cement 18 to the entire surface of the forepart of the insole if this is found to be more convenient.

The hereinafter-described cement will dry to a substantially nontacky condition in a short time and the parts so cemented will remain in good condition for a week or more before further processing.

To facilitate lasting, the cemented uppers may be mulled in a chamber supplied with warm moist air, there being no danger of affecting the cement the melting point of which is above 130° C. The upper 10 and insole 20 are assembled on a last 22 in the usual manner and the shoe is pulled over on a pulling-over machine, for example, one of the type disclosed in Letters Patent of the United States No. 663,777, granted December 11, 1900, in the name of R. F. McFeely, the toe portion of the shoe then appearing as shown in Fig. 3. The upper 10 is thus tensioned lengthwise and laid over the insole at the toe end of the shoe where it is secured by a tack 24, and it is also tensioned crosswise of the vamp and laid over the insole at the sides where it is secured by tacks 26. The cement 12 on the vamp and the cement 18 on the insole is so dry at this time that there is no objectionable sticking of the vamp to the insole notwithstanding the pressure applied to the upper by the wipers of the pulling-over machine.

The shoe may now be side lasted, as shown in Fig. 4, for example, by curved staples 28 on a machine of the type disclosed in Letters Patent of the United States No. 1,815,297, granted July 21, 1931, in the name of George Goddu. The heel-seat may be lasted, as shown in Fig. 5, on a heel-seat lasting machine of the type disclosed in Letters Patent of the United States No. 2,059,241, granted November 3, 1936, in the name of J. C. Jorgensen, by which the heel-seat tacks 30 are driven. At this time the operator of the heel-seat lasting machine may pull the pulling-over tacks 24, 26.

The cement on the toe portion of the shoe is now activated by radiant heat, for example, as shown diagrammatically in Fig. 6 where the shoe is supported right side up on a grid 32. Below the toe is an electric heating unit 34 with a reflector 36 directing the heat toward the cement on the insole and upper to activate it, and above the shoe is a similar unit 38 and a reflector 40 directing heat toward the mulled upper of the shoe to soften it for the lasting operation.

To last the toe portion of the upper, as illustrated in Fig. 7, the shoe, after activation of the cement, is presented to a lasting machine which may be an automatic toe lasting machine of the type disclosed in Letters Patent of the United States No. 2,596,169, granted May 13, 1952, in the names of L. E. Proulx and R. L. Hill. This machine conforms the toe portion of the upper to the last, wipes its marginal portion over the insole onto the last bottom, and applies substantial pressure to the overlasted upper whereupon the activated cement on the insole and upper takes hold and immediately secures the upper to the insole in finally lasted position where it remains without further fastening of any kind.

In order that the lasts may be removed sooner than they could be if the shoes were allowed to dry at normal room temperature, the lasted shoes are preferably put in a drying chamber in which air circulated by a fan and heated by infrared lamps serves to dry the uppers without affecting the holding power of the cement the softening point of which is above the temperature of the drying chamber.

When dry, an outsole 42 is laid on the shoe bottom, the last is removed and the sole is secured to the upper and insole by through-and-through fastenings, for example, by lockstitches 44 inserted by a sewing machine such as that disclosed in Letters Patent of the United States No. 1,688,056, granted April 16, 1928, in the name of J. H. Reed. The shoe, after outsoling, will have a heel attached and be finished in the usual manner.

A cement for use in the above-described method may be made as follows: A high melting point resin (132° C.) is first emulsified. The resin selected is a pentaerythritol ester of a phenolic modified rosin such as that manufactured by the Hercules Powder Company and sold under the name of Pentalyn F. To render the resin emulsifiable it is first treated with solvent, for example:

*Formula I*

| | | |
|---|---|---|
| Pentalyn F | pounds | 700 |
| Xylol | gallons | 8.75 |
| Toluol | do | 21.75 |

The prepared resin is next emulsified with other ingredients as follows:

*Formula II*

| | |
|---|---|
| Formula I | 484.22 lbs. |
| Casein (emulsifying agent) | 15 lbs. |
| Ammonia (to cut the casein) | 1.25 gals., 27% solution. |
| Potassium hydroxide (stabilizer). | .16 gal., 40% solution. |
| Phenol (liquid) (preservative). | .35 gal., 95% solution. |
| Water | 42.98 gals. |

The cement is made up according to the following formula:

*Formula III*

| | |
|---|---|
| Formula II (resin emulsion) | 32.75 gals. |
| Commercial anti-foaming agent. | .29 gal. |
| 60% rubber latex (natural) | 61.66 gals. |
| Zinc dibutyl dithiocarbamate (antioxidant). | 1.82 gals. 50% water dispersion. |
| Water | 3.48 gals. |

This cement is a low resin, high rubber formulation of moderate viscosity. Dried films of this cement appear to be unaffected by steam and will not readily flow under extreme temperature. Because of the nature of the resin, the dry film elongates little under stress, thereby giving the effect of a tight short-legged bond.

Having thus described my invention, what I claim as new and desire to secure by Letters Patent of the United States is:

1. That improvement in methods of making shoes which consists in applying rubber latex-resin cement to the margins of an upper and insole prior to assembling the upper and insole upon a last, allowing the cement to dry, assembling the upper and insole on a last, pulling the upper over the insole on the last while the cement is dry and nontacky, subjecting the toe portion of the shoe to dry heat to activate the cement, utilizing a wiper lasting machine to conform the upper to the toe of the last, to lay the margin of the cemented upper over upon the cemented insole and to press the overlasted upper upon the insole, and immediately withdrawing the wipers.

2. That improvement in methods of making shoes which consists in applying to the margins of an upper and insole rubber latex cement carrying a substantial quantity of dispersed high-melting point resin, allowing the cement to dry, assembling the upper and insole on a last, pulling the upper over the insole on the last while the cement is dry and nontacky, subjecting the toe portion of the shoe to radiant heat to activate the cement, utilizing a wiper lasting machine to conform the upper to the toe of the last, to lay the margin of the cemented upper over upon the cemented insole and to press the overlasted upper upon the insole, and immediately withdrawing the wipers.

3. That improvement in methods of making shoes which consists in applying to the margins of an upper and insole prior to assembling the upper and insole on a last rubber latex cement carrying a substantial quantity of dispersed resin having a melting point above 130° C., mulling the upper, assembling the upper and insole on a last, pulling the upper over the insole on the last while the cement is dry and nontacky, subjecting the toe portion of the shoe to radiant heat to activate the cement and soften the upper, utilizing a wiper lasting machine to conform the upper to the toe of the last, to lay the margin of the cemented upper over upon the cemented insole and to press the overlasted upper upon the insole, and immediately withdrawing the wipers.

4. That improvement in methods of making shoes which consists in applying to the margins of an upper and insole prior to assembling the upper and insole on a last rubber latex cement carrying dispersed phenol modified pentaerythritol resin, the ratio of latex to resin being approximately 2 to 1, allowing the cement to dry, assembling the upper and insole on a last, pulling the upper over the insole on the last while the cement is dry and nontacky, pulling the pulling-over tacks, subjecting the toe portion of the shoe to radiant heat to activate the cement, utilizing a wiper lasting machine to conform the upper to the toe of the last, to lay the margin of the cemented upper over upon the cemented insole and to press the overlasted upper upon the insole, and immediately withdrawing the wipers.

References Cited in the file of this patent

UNITED STATES PATENTS

| | | |
|---|---|---|
| 261,602 | Hawkes | July 25, 1882 |
| 2,028,245 | Pym | Jan. 21, 1936 |
| 2,192,274 | Roberts | Mar. 5, 1940 |
| 2,223,844 | Cordeau | Dec. 3, 1940 |

OTHER REFERENCES

"Hercules Resins for Adhesives," published by Hercules Powder Co., 1951. (Copy in Div. 50.)